US006999676B2

(12) United States Patent　　　(10) Patent No.: US 6,999,676 B2
Hsien et al.　　　(45) Date of Patent: Feb. 14, 2006

(54) OPERATING APPARATUS FOR MOVING A POP-UP FLASH UNIT FROM A NON-PROJECTED POSITION TO A PROJECTED POSITION ON A PHOTOGRAPHIC DEVICE

(75) Inventors: Yu-Hsuan Hsien, Dong-Guan (TW); Teng-Ko Kuo, Dong-Guan (TW)

(73) Assignee: Asia Optical Co., Inc., Taichung (TW)

( * ) Notice: Subject to any disclaimer, the term of this patent is extended or adjusted under 35 U.S.C. 154(b) by 117 days.

(21) Appl. No.: 10/827,722

(22) Filed: Apr. 19, 2004

(65) Prior Publication Data

US 2004/0228624 A1　Nov. 18, 2004

(30) Foreign Application Priority Data

Dec. 1, 2003　(TW) ............................... 92133700 A (51) Int. Cl.
　　*G03B 15/03*　　(2006.01)
(52) U.S. Cl. ..................................................... 396/177
(58) Field of Classification Search ......... 396/176–178
See application file for complete search history.

(56) References Cited

U.S. PATENT DOCUMENTS

| 4,893,140 A | * | 1/1990 | Yamamoto et al. ......... 396/177 |
| 5,337,105 A | * | 8/1994 | Vaynshteyn ................. 396/177 |
| 6,909,847 B1 | * | 6/2005 | Ujikane et al. ............. 396/178 |

* cited by examiner

Primary Examiner—W. B. Perkey
(74) Attorney, Agent, or Firm—Townsend and Townsend and Crew LLP (57) ABSTRACT

An operating apparatus is utilized in a photographic device, and includes a base frame, a rotating seat, and a moving seat that carries a pop-up flash unit thereon. The rotating seat and the moving seat are disposed within a first accommodating chamber in the base frame. When a starter button is operated, the rotating seat rotates from a first position to a second position, where the rotating seat projects from the base frame. The moving seat moves away from the rotating seat from a retracted position to an extended position during rotation of the rotating seat. As such, the flash unit is transformed from a non-projected position to a projected position so as to increase the distance between the flash unit and a lens and thus the light distribution angle of the flash unit, thereby improving the photographic quality of the photographic device.

21 Claims, 15 Drawing Sheets

OPERATING APPARATUS FOR MOVING A POP-UP FLASH UNIT FROM A NON-PROJECTED POSITION TO A PROJECTED POSITION ON A PHOTOGRAPHIC DEVICE

CROSS-REFERENCE TO RELATED APPLICATION

This application claims priority of Taiwanese Application No. 092133700, filed on Dec. 1, 2003.

BACKGROUND OF THE INVENTION

1. Field of the Invention

This invention relates to a pop-up flash unit for a photographic device, and more particularly to an operating apparatus for moving a pop-up flash unit from a non-projected position to a projected position on a photographic device.

2. Description of the Related Art

Figure 1:
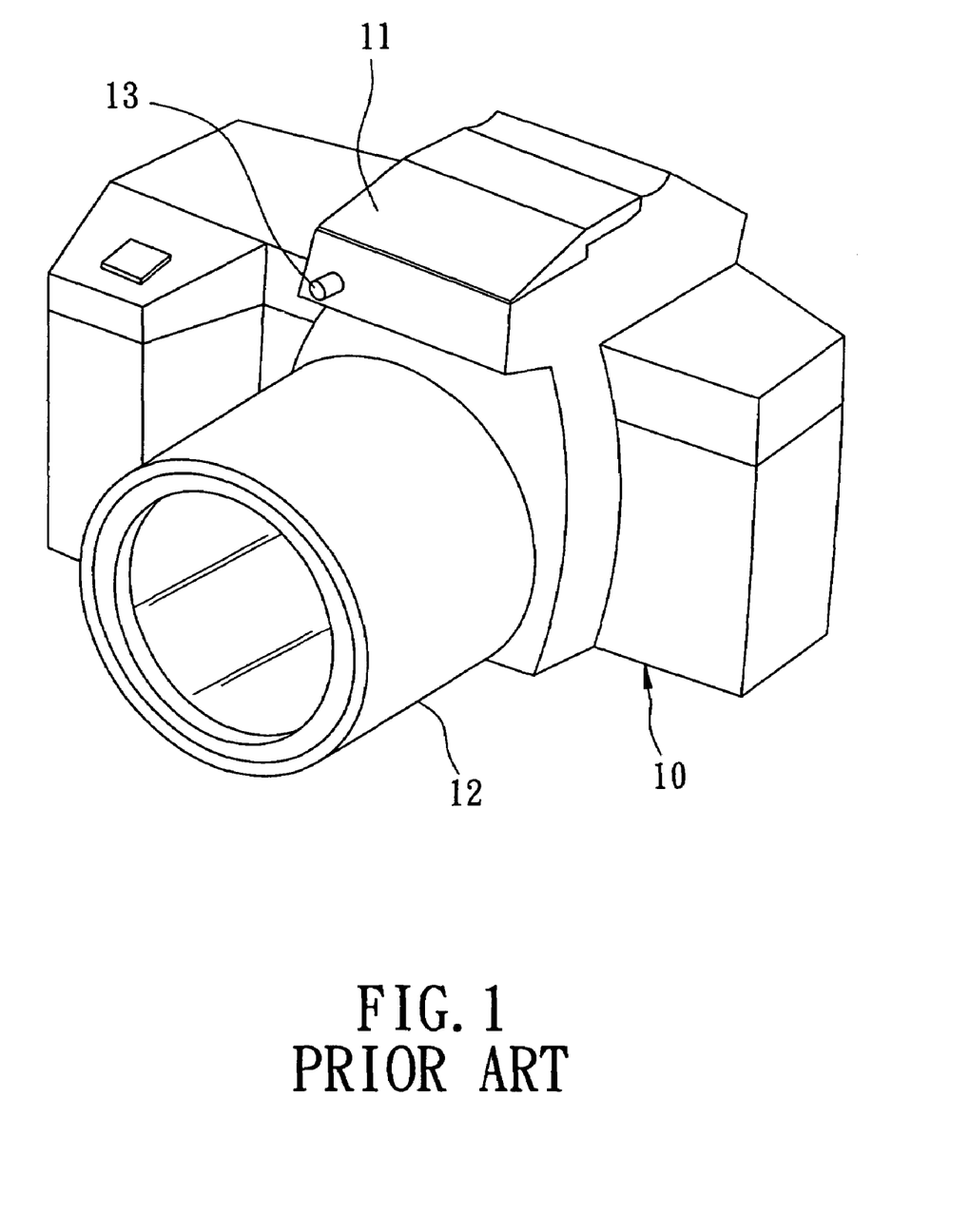
FIG. 1 a perspective view of a conventional camera, illustrating how a pop-up flash unit is disposed at a non-projected position.
Figure 2:
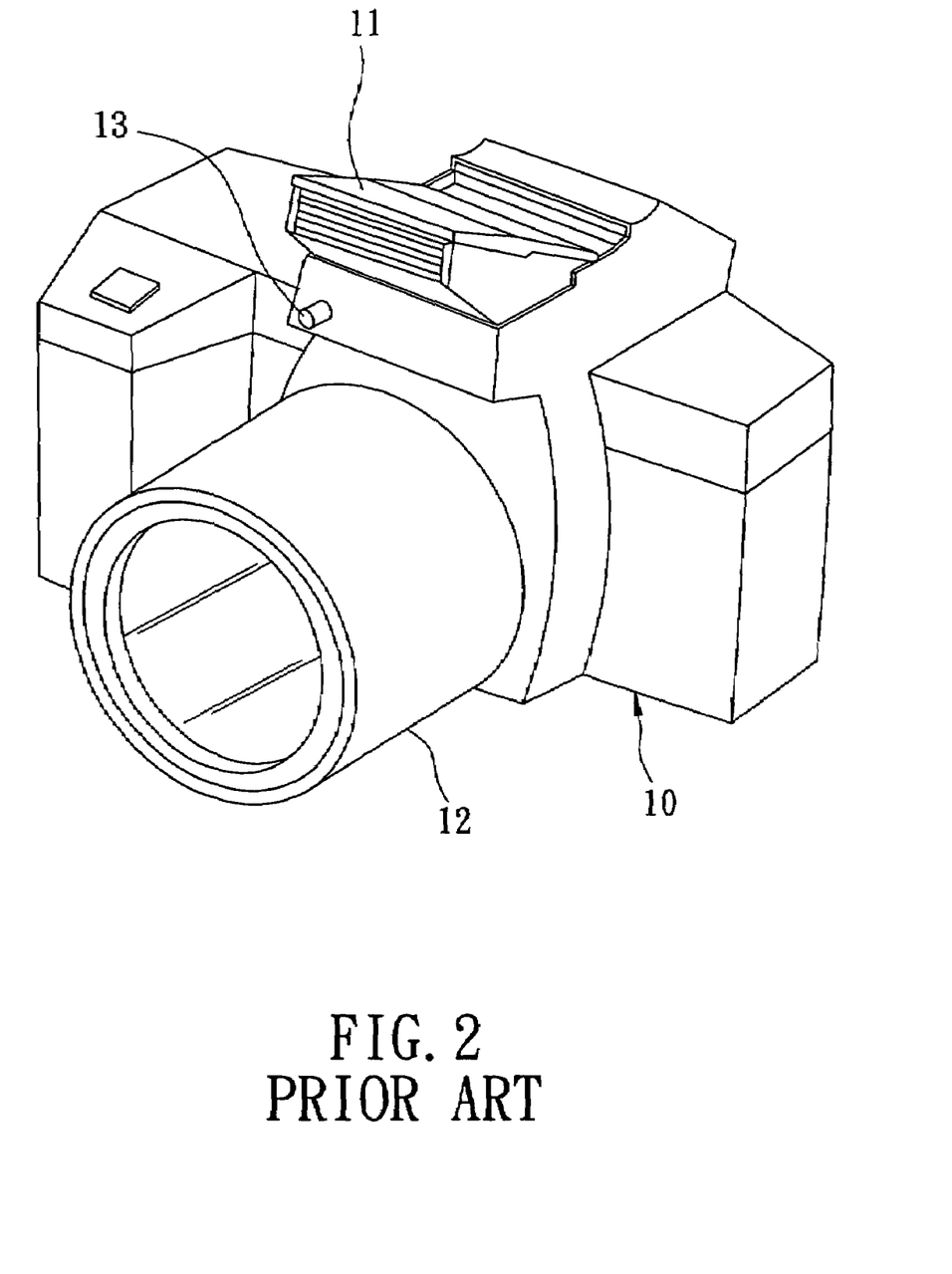
FIG. 2 is a perspective view of the conventional camera, illustrating how the flash unit is disposed at a projected position.

Referring to FIGS. 1 and 2, a conventional photographic device 10 in the form of a camera is shown to include a pop-up flash unit 11, a lens 12, and a starter button 13. When the starter button 13 is operated, the flash unit 11 is moved by an operating apparatus (not shown) from a non-projected position shown in FIG. 1 to a projected position shown in FIG. 2. As such, the distance between the flash unit 11 and the lens 12 and thus the light distribution angle of the flash unit 11 are increased so as to improve the photographic quality of the photographic device 10. However, with the current trend of photographic devices toward compactness, when the flash unit 11 is in use, the increase in distance between the flash unit and the lens is limited when the flash unit is in use. Thus, the light distribution angle of the flash unit 11 cannot be increased effectively.

SUMMARY OF THE INVENTION

The object of this invention is to provide an operating apparatus for a photographic device, which can move a pop-up flash unit from a non-projected position to a projected position by a comparatively large distance so as to increase effectively the light distribution angle of the flash unit and thus the photographic quality of the photographic device.

According to this invention, an operating apparatus is utilized in a photographic device, and includes a base frame, a rotating seat, and a moving seat that carries a pop-up flash unit thereon. The rotating seat and the moving seat are disposed within a first accommodating chamber in the base frame. When a starter button is operated, the rotating seat rotates from a first position to a second position, where the rotating seat projects from the base frame. The moving seat moves away from the rotating seat from a retracted position to an extended position during rotation of the rotating seat. As such, the flash unit is transformed from a non-projected position to a projected position so as to increase the distance between the flash unit and a lens and thus the light distribution angle of the flash unit, thereby improving the photographic quality of the photographic device. The flash unit can be moved by a relatively large distance from the non-projected position to the projected position due to the rotation of the rotating seat and the movement of the moving seat.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 3:
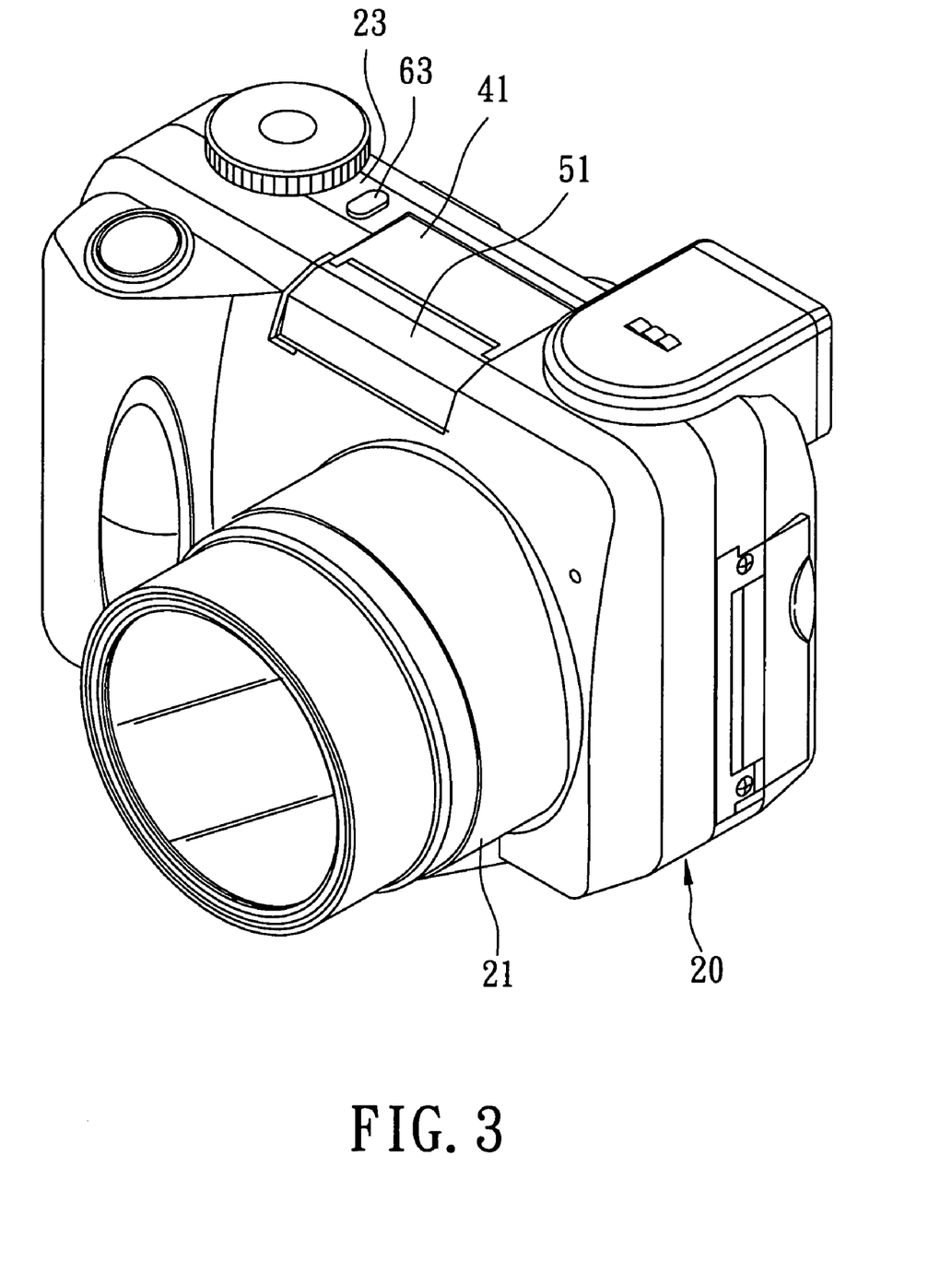
FIG. 3 is an assembled perspective view of the preferred embodiment of an operating apparatus for a photographic device according to this invention, illustrating how a pop-up flash unit is disposed at a non-projected position.
Figure 4:
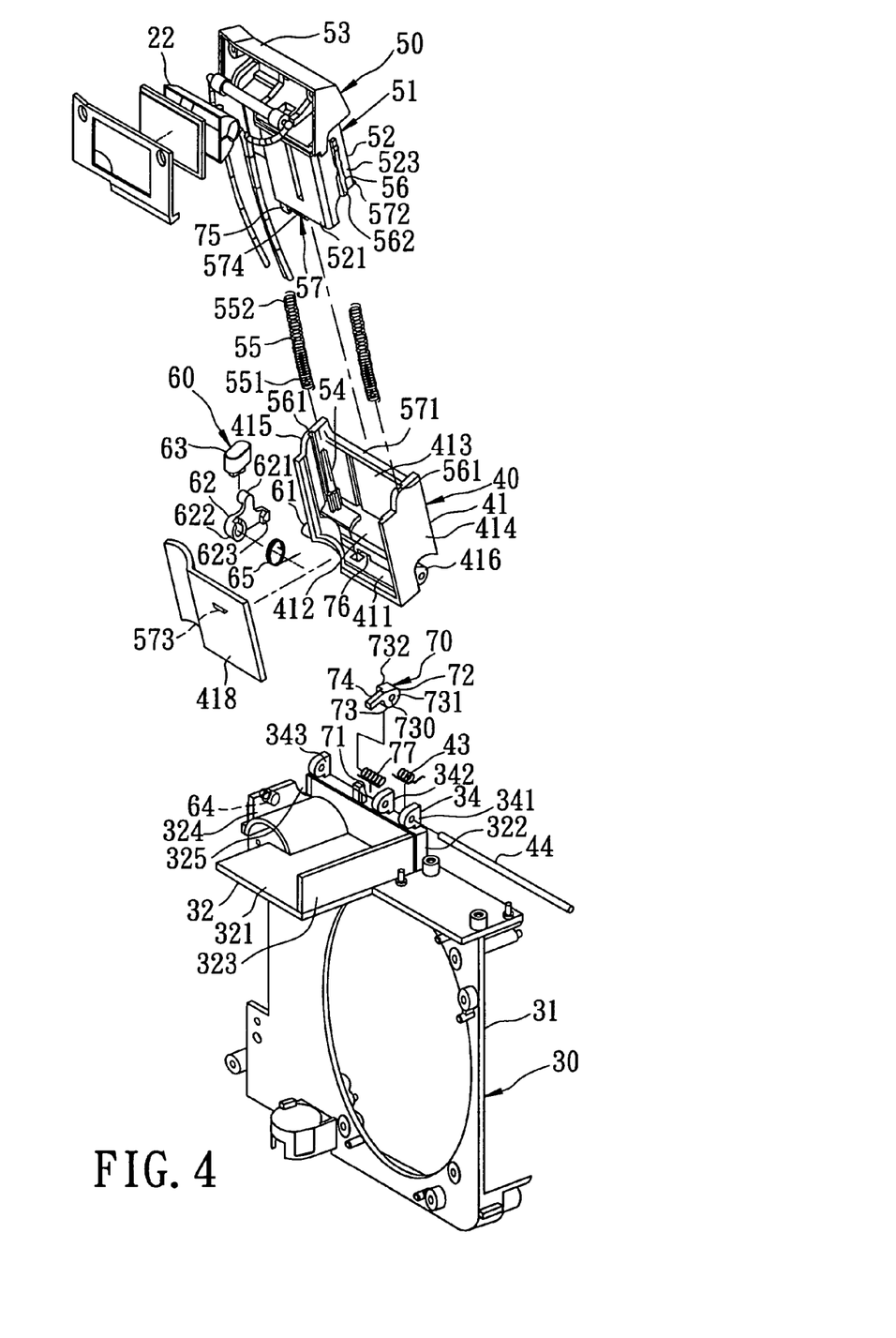
FIG. 4 is an exploded perspective front view of the preferred embodiment.
Figure 5:
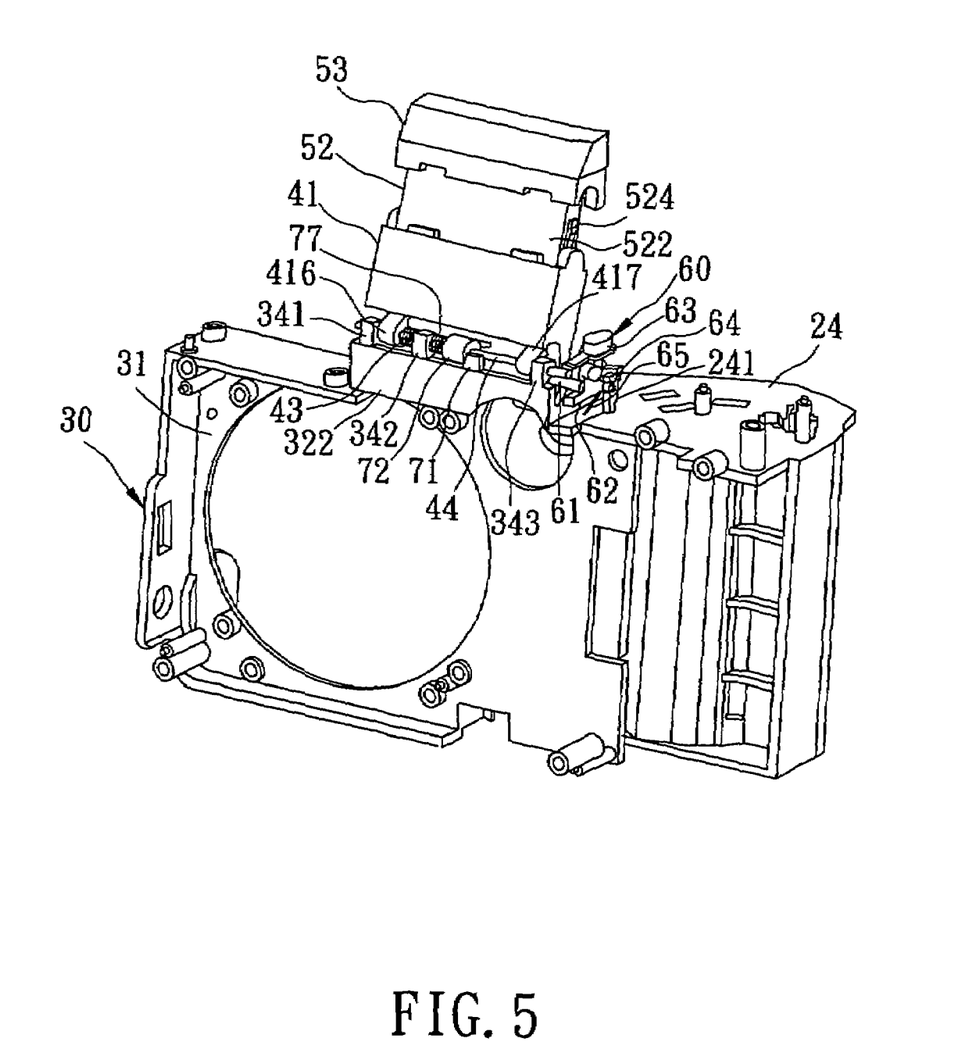
FIG. 5 is a fragmentary assembled perspective rear view of the preferred embodiment.

Referring to FIGS. 3, 4, and 5, the preferred embodiment of an operating apparatus is mounted on a photographic device 20 in the form of a camera, and is shown to include a base frame 30, a rotating unit 40, a moving unit 50, a rotation-controlling unit 60, and a movement-controlling unit 70. The photographic device 20 is provided with a pop-up flash unit 22 that is mounted to the moving unit 50.

The base frame 30 includes a lens-receiving portion 31 for mounting of a lens 21 thereon, an accommodating portion 32 disposed above the lens-receiving portion 31, and a plurality of lugs 34.

The accommodating portion 32 has a bottom wall 321, a rear wall 322, and two sidewalls 323, 324. The rear wall 322 and the sidewalls 323, 324 extend upwardly from the bottom wall 321 to define a first accommodating chamber 33 (see FIG. 8) thereamong.

The sidewall 324 is formed with a slot 325 that has an open top end.

The lugs 34 are formed on a top end of the accommodating portion 32, and include first, second, and third lugs 341, 342, 343.

The rotating unit 40 includes a rotating seat 41, a first biasing member 43, and a horizontal pivot pin 44.

The rotating seat 41 has a bottom wall 411, a connecting wall 412 coupled with the bottom wall 411, a rear wall 413 coupled with the connecting wall 412, and two sidewalls 414, 415 (see FIG. 4) coupled with the bottom wall 411, the connecting wall 412, and the rear wall 413. The rotating seat 41 further has a front cover 418 that is attached fixedly to the bottom wall 411 and the sidewalls 414, 415 to define a second accommodating chamber 42 (see FIG. 8) thereamong, which has an open top end. The connecting wall 412 is formed with two lugs 416, 417 (see FIGS. 4 and 5). The horizontal pivot pin 44 extends through the lugs 416, 417 of the rotating seat 41 and the lugs 341, 342, 343 of the base frame 30 so as to permit rotation of the rotating seat 41 relative to the base frame 30.

Figure 8:
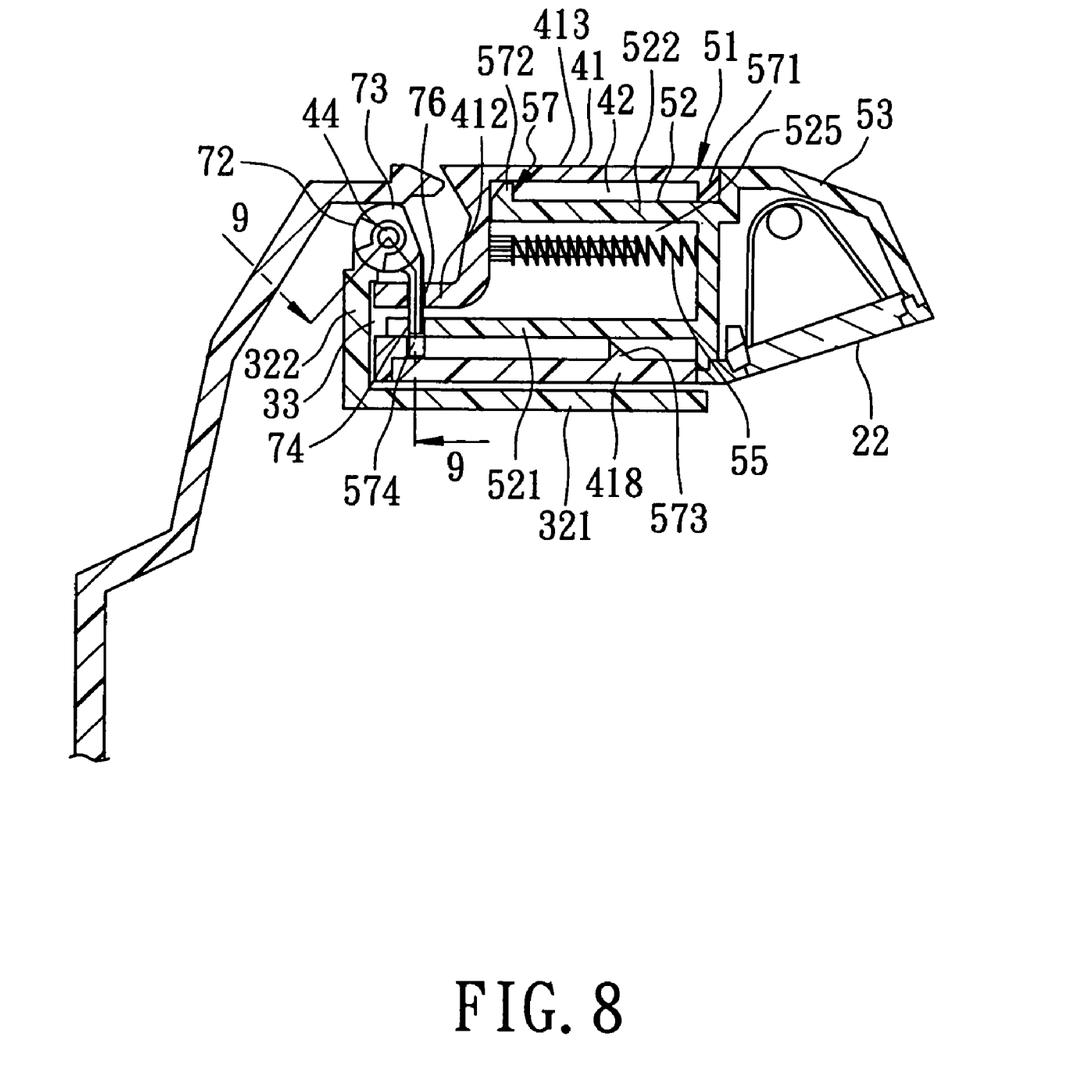
FIG. 8 is a fragmentary sectional view of the preferred embodiment, illustrating how the flash unit is retained at the non-projected position.
Figure 15:
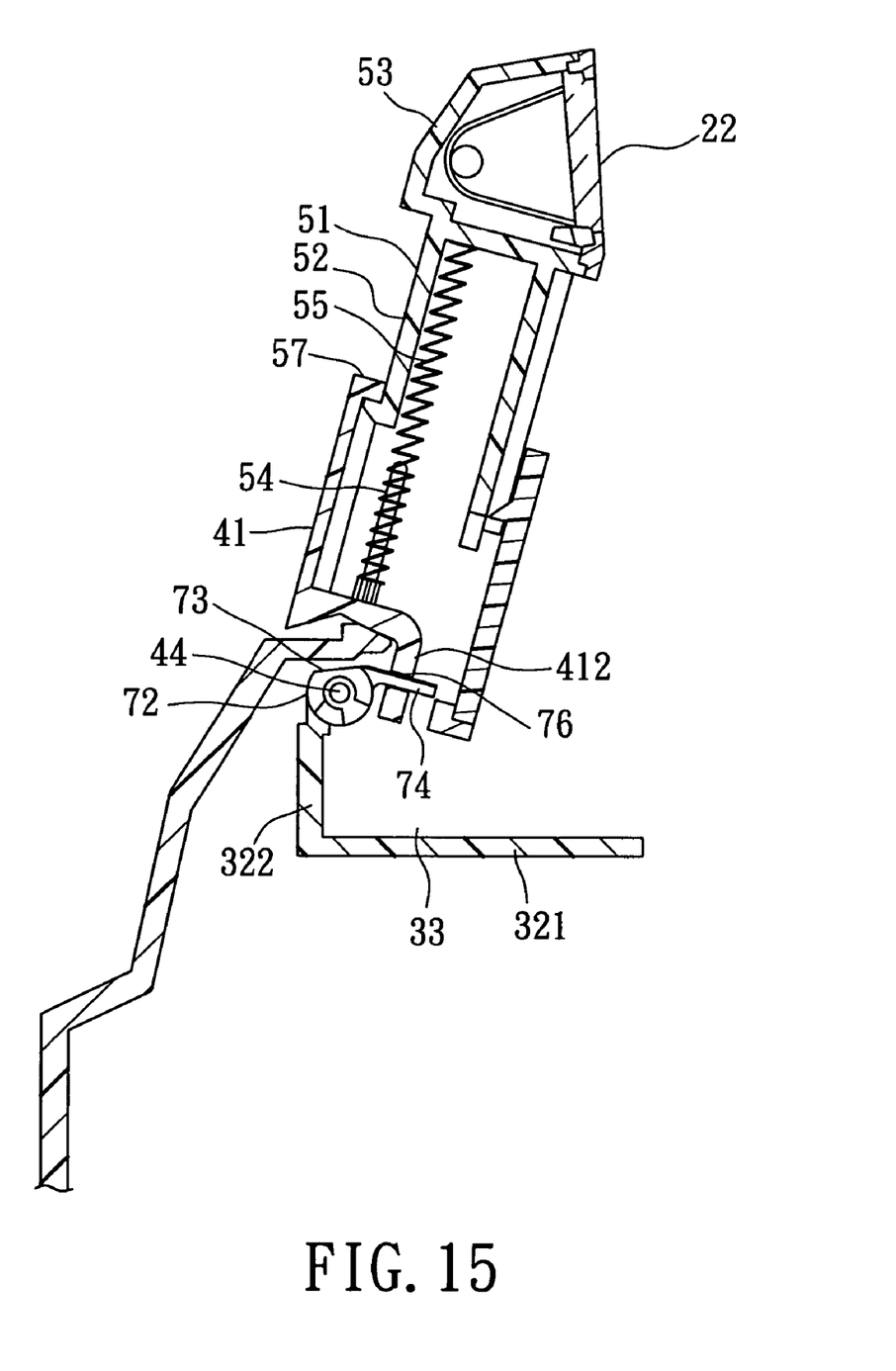
FIG. 15 is a fragmentary sectional view of the preferred embodiment, illustrating how the rotating seat and a moving seat are disposed respectively at the second position and an extended position.

The first biasing member 43 is configured as a torsional spring, is sleeved around the horizontal pivot pin 44, and has two ends that are inserted respectively into the lugs 342, 416 of the base frame 30 and the rotating seat 41 so as to bias the rotating seat 41 to rotate relative to the base frame 30 from a first position shown in FIG. 8, where the rotating seat 41 is disposed within the first accommodating chamber 33 in the base frame 30 and where the flash unit 22 is disposed at a non-projected position, to a second position shown in FIG. 15, where the rotating seat 41 projects from the first accommodating chamber 33 in the base frame 30.

Referring to FIGS. 4, 5, and 8, the moving unit 50 includes a moving seat 51, two mounting posts 54, and two second biasing members 55.

The moving seat 51 has a lower insert portion 52 that is disposed movably within the second accommodating chamber 42 in the rotating seat 41 when the rotating seat 41 is disposed at the first position, and an upper mounting portion 53 that is connected fixedly to the flash unit 22.

The lower insert portion 52 has a front wall 521, a rear wall 522, two sidewalls 523, 524, and a third accommodating chamber 525 (see FIG. 8) that is defined among the front wall 521 (see FIGS. 4 and 8), a rear wall 522 (see FIGS. 5 and 8), and the sidewalls 523, 524 (see FIGS. 4 and 5).

The mounting posts 54 are fixed within the second accommodating chamber 42 in the rotating seat 41, and are spaced apart from each other.

The second biasing members 55 are configured as coiled compression springs, are disposed within the second accommodating chamber 42 in the rotating seat 41, and have lower ends 551 that are sleeved respectively around the mounting posts 54, and upper ends that press against a bottom surface of the upper mounting portion 53 of the moving seat 51 so as to bias the moving seat 51 to move away from the rotating seat 41 from a retracted position shown in FIG. 8 to an extended position shown in FIG. 15, where the flash unit 22 is disposed at a projected position.

A guiding assembly 56 includes two aligned straight slots 561 formed in the rotating seat 41, and two guiding blocks 562 (only one is shown in FIG. 4) attached respectively and fixedly to two opposite side surfaces of the lower insert portion 52 of the moving seat 51 and received respectively and slidably within the guide slots 561 in the rotating seat 41. As such, the moving seat 51 can be guided by the guiding assembly 56 to move relative to the rotating seat 41 along a direction parallel to the guide slots 561 and the guiding blocks 562. Alternatively, the guiding blocks 562 may be formed in the rotating seat 41, and the guide slots 561 may be formed on the moving seat 51.

A positioning assembly 57 includes two projecting blocks 572, 574 that are disposed fixedly on the moving seat 51, and two stop blocks 571, 573 that are disposed fixedly on the rotating seat 41. When the moving seat 51 is disposed at the extended position shown in FIG. 15, the projecting blocks 572, 574 engage respectively the stop blocks 571, 573 so as to prevent further movement of the moving seat 51 away from the rotating seat 41, thereby retaining the moving seat 51 at the extended position. It is noted that the biasing force value of the second biasing members 55 can be based upon to set the distance traveled by the moving seat 51 from the retracted position to the extended position, thereby dispensing with the need for the positioning assembly 57.

The rotation-controlling unit 60 includes a horizontal stop rod 61 connected fixedly to the rotating seat 41 and extending through the slot 325 in the sidewall 324 of the accommodating portion 32 of the base frame 30, a first positioning member 62 disposed swingably on the accommodating portion 32 of the base frame 30, and a starter button 63 disposed movably on a top cover 23 of the photographic device 20.

The accommodating portion 32 of the base frame 30 is formed with an integral horizontal support rod 64.

Figure 7:
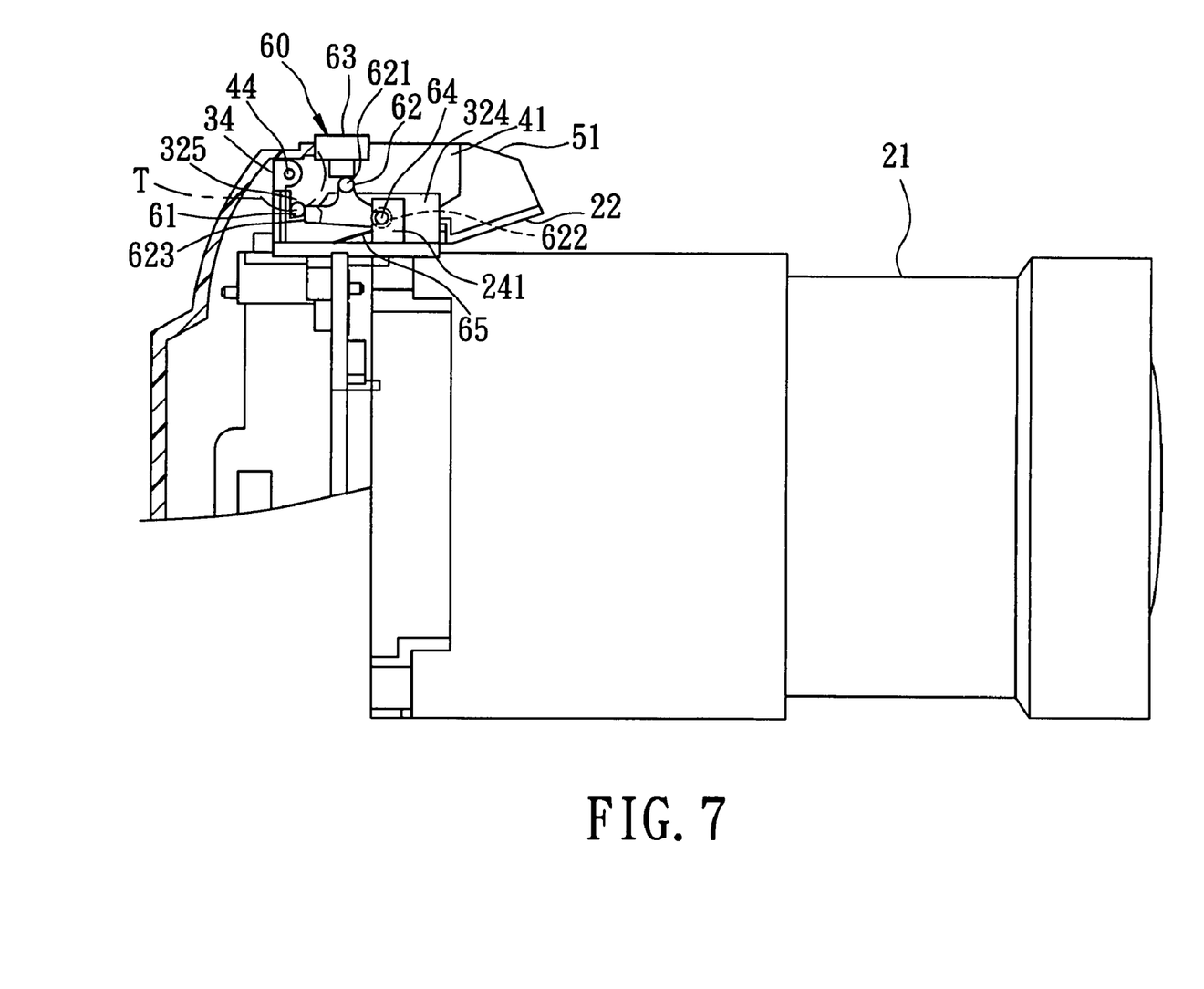
FIG. 7 is a fragmentary, schematic, partly sectional side view of the preferred embodiment, illustrating how a rotating seat is retained at a first position.

The first positioning member 62 includes a contact block 621 contacting the starter button 63 such that operation of the starter button 63 can swing the contact block 621, a tubular portion 622 connected fixedly to the contact block 621 and sleeved rotatably around the support rod 64, and a pressing block 623 connected fixedly to the contact block 621. A battery cover 24 of the photographic device 20 has an integral support block 241 that supports an end of the support rod 64 thereon so as to prevent removal of the first positioning member 62 from the support rod 64. When the rotating seat 41 is disposed at the first position shown in FIG. 7, the pressing block 623 is biased by a torsional spring 65, which is disposed between the first positioning member 62 and the bottom wall 321 of the base frame 30, to press against the stop rod 61. At this time, the pressing block 623 is disposed at a curved path (T) (see FIGS. 7 and 11) of the stop rod 61 so as to prevent rotation of the rotating seat 41 from the first position to the second position. The starter button 63 can be depressed to rotate and separate the first positioning member 62 from the stop rod 61, thereby permitting rotation of the rotating seat 41 from the first position to the second position.

The movement-controlling unit 70 includes a fixed block 71 disposed fixedly on the rear wall 322 of the accommodating portion 32 of the base frame 30 between the second and third lugs 342, 343, a second positioning member 72 sleeved rotatably around the pivot pin 44 and contacting the fixed block 71, a retaining hook 75 connected fixedly to the front wall 521 of the lower insert portion 52 of the moving seat 51, and a straight slot 76 formed through the connecting wall 412 of the rotating seat 41 and extending along a direction parallel to the pivot pin 44.

Figure 6:
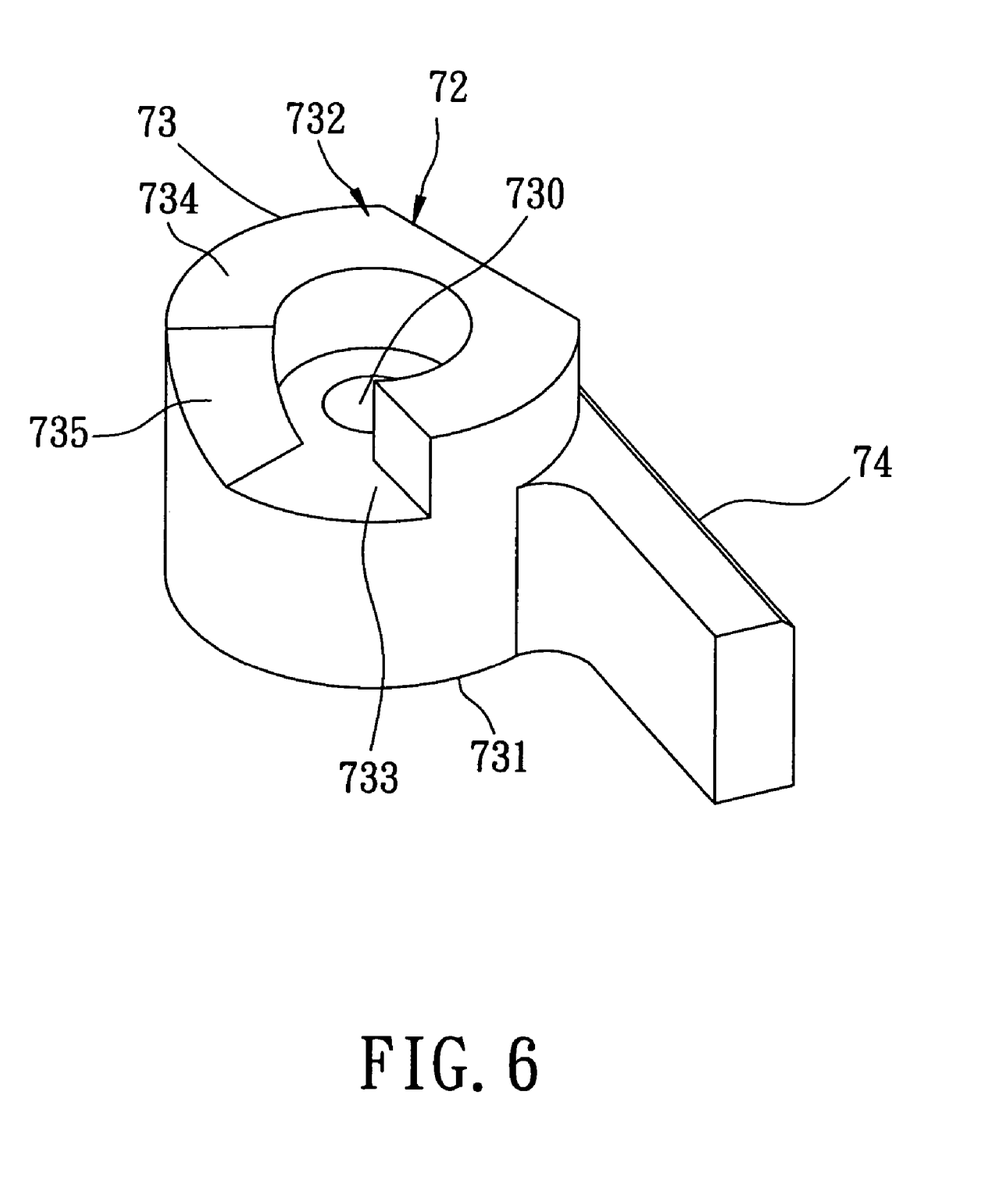
FIG. 6 is a perspective view of a second positioning member of the preferred embodiment.
Figure 9:
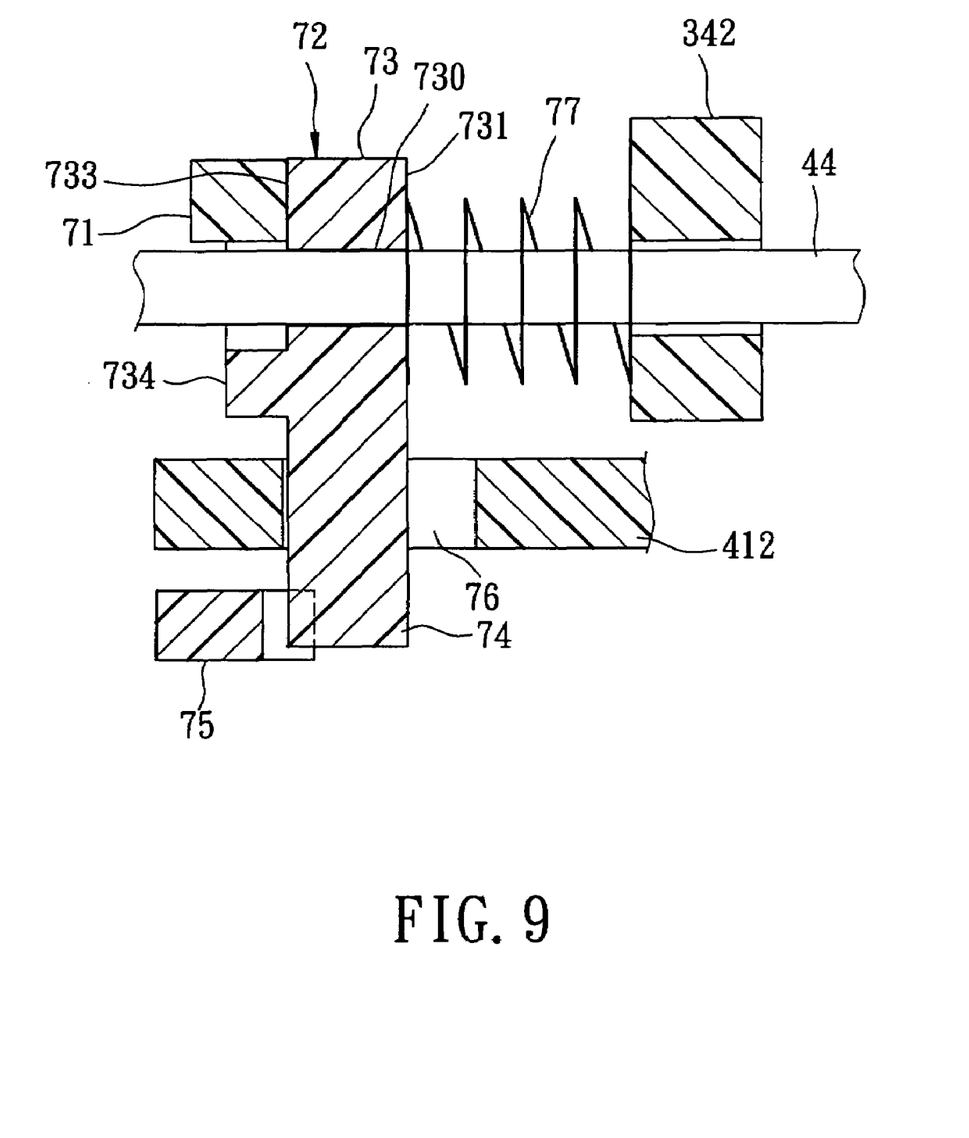
FIG. 9 is a sectional view taken along line 9—in FIG. 8.

Referring to FIGS. 4, 6, and 8, the second positioning member 72 includes a sleeve portion 73 having a hole 730 and sleeved movably around the pivot pin 44, and a fixed engaging arm 74 formed integrally with the sleeve portion 73 and received slidably within the straight slot 76 in the rotating seat 41 so as to permit synchronous rotation of the moving seat 51 and the rotating seat 41 and movement of the second positioning member 72 along the pivot pin 44 toward and away from the retaining hook 75. The structure of the engaging arm 74 and the straight slot 76 can be replaced with a spline structure to perform the same function. When the moving seat 51 is disposed at the retracted position shown in FIG. 8, the engaging arm 74 engages the retaining hook 75 so as to prevent movement of the moving seat 51 relative to the rotating seat 41, as shown in FIG. 9. The sleeve portion 73 has a flat side surface 731 and a block-engaging side surface 732 that are opposite to each other and that are perpendicular to the pivot pin 44. The block-engaging side surface 732 has a first surface portion 733, a second surface portion 734, and an inclined surface portion 735 interconnecting the first and second surface portions 733, 734. The first, inclined, and second surface portions 733, 735, 734 are arranged along a circumferential direction of the second positioning member 72. The first and second surface portions 733, 734 are planar, and are parallel to the flat side surface 731. The distance between the first surface portion 733 and the flat side surface 731 is smaller than that between the second surface portion 734 and the flat side surface 731.

The movement-controlling unit 70 further includes a coiled compression spring 77 that is sleeved around the pivot pin 44 between the second positioning member 72 and the second lug 342 of the base frame 30 so as to press the block-engaging side surface 732 of the second positioning member 72 against the fixed block 71.

When the rotating seat 41 is disposed at the first position, the first surface portion 733 is biased by the spring 77 to press against the fixed block 71 so as to engage the engaging arm 74 with the retaining hook 75 so as to prevent movement of the moving seat 51 from the retracted position to the extended position, as shown in FIG. 9.

Figure 10:
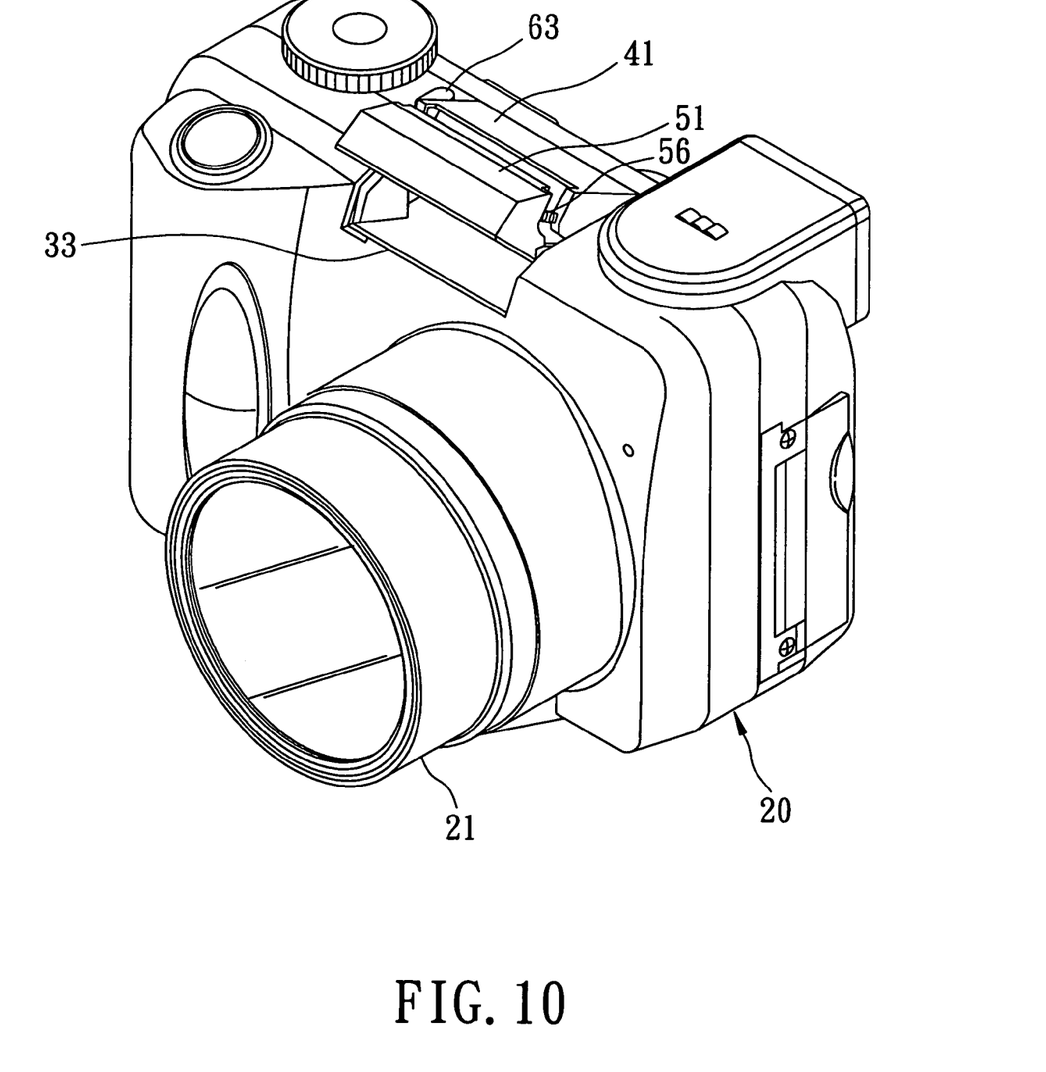
FIG. 10 is an assembled perspective view of the preferred embodiment, illustrating how the rotating seat is disposed between the first position and a second position.
Figure 11:
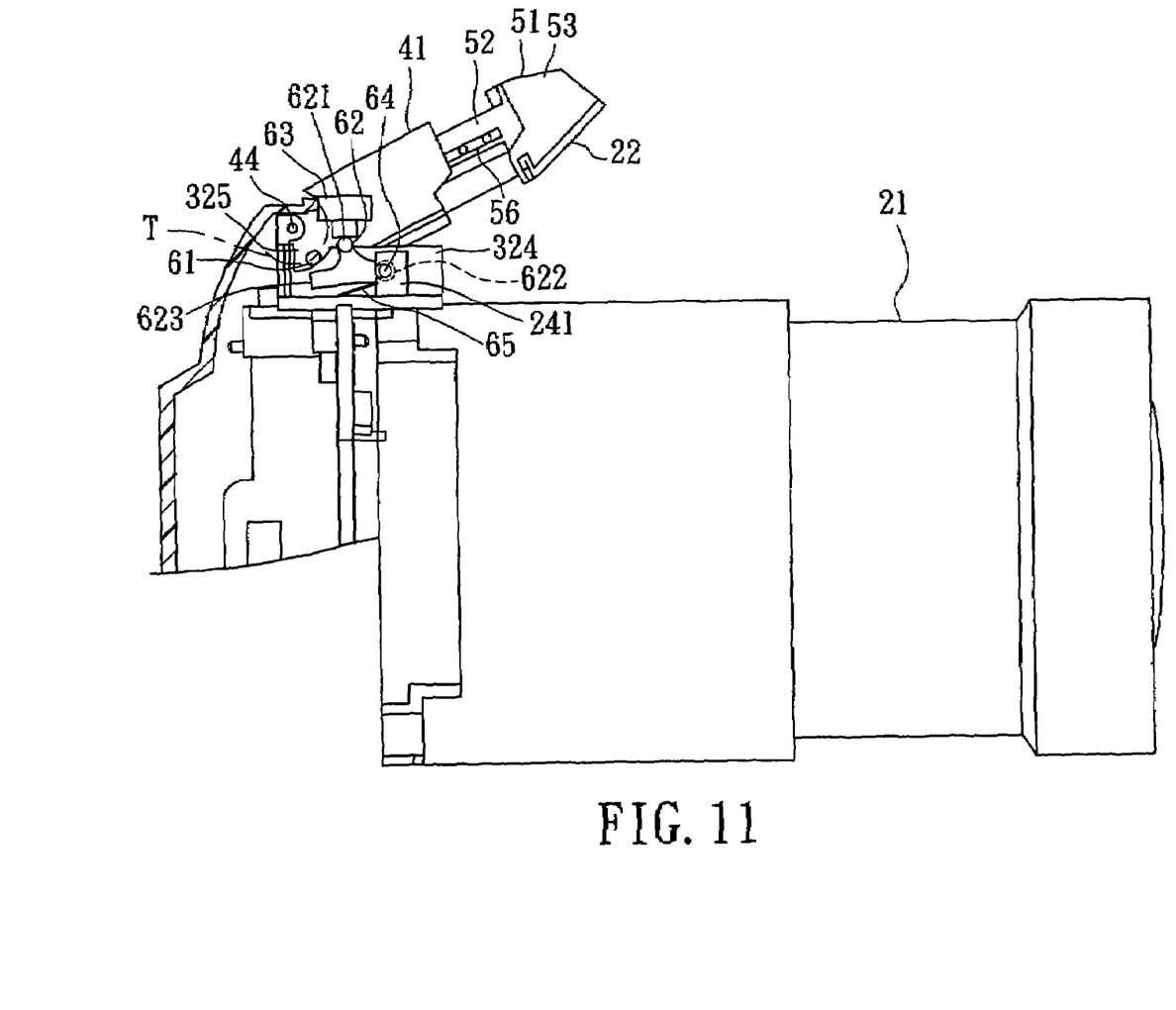
FIG. 11 is a fragmentary, schematic, partly sectional side view of the preferred embodiment, illustrating how the rotating seat is released from a first positioning member.
Figure 12:
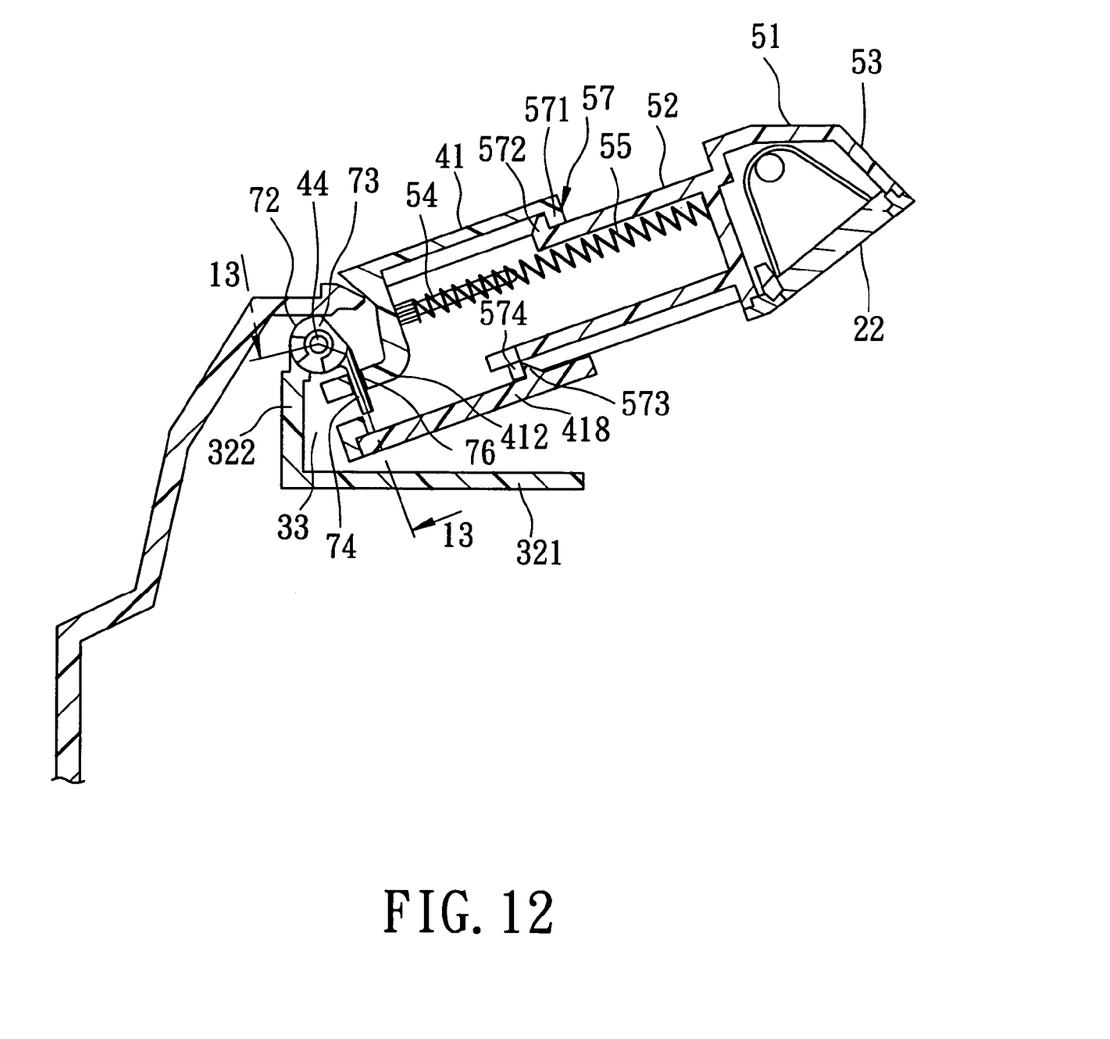
FIG. 12 is a fragmentary sectional view of the preferred embodiment, illustrating how the rotating seat rotates from the first position.
Figure 13:
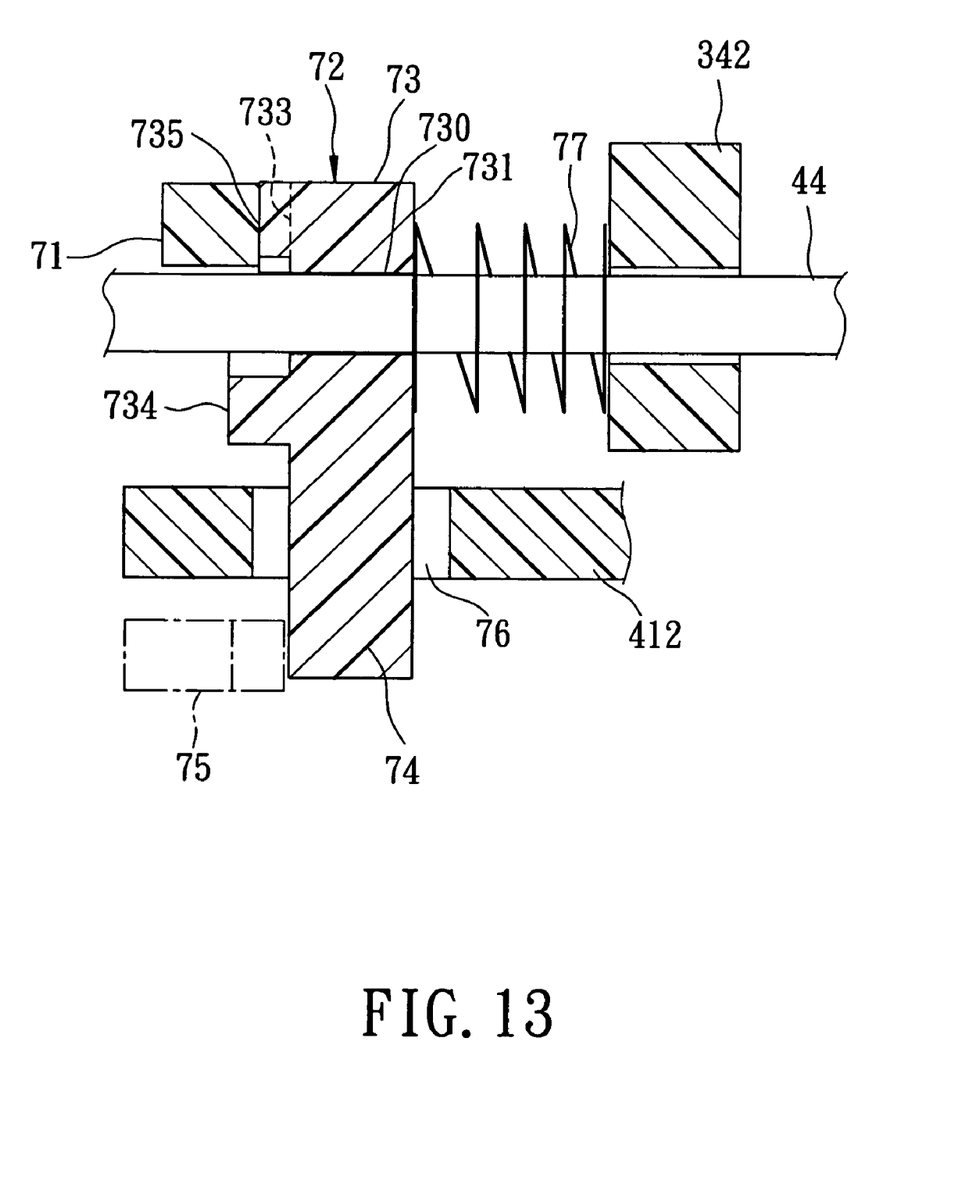
FIG. 13 is a sectional view taken along Line 13—13 in FIG. 12.
Figure 14:
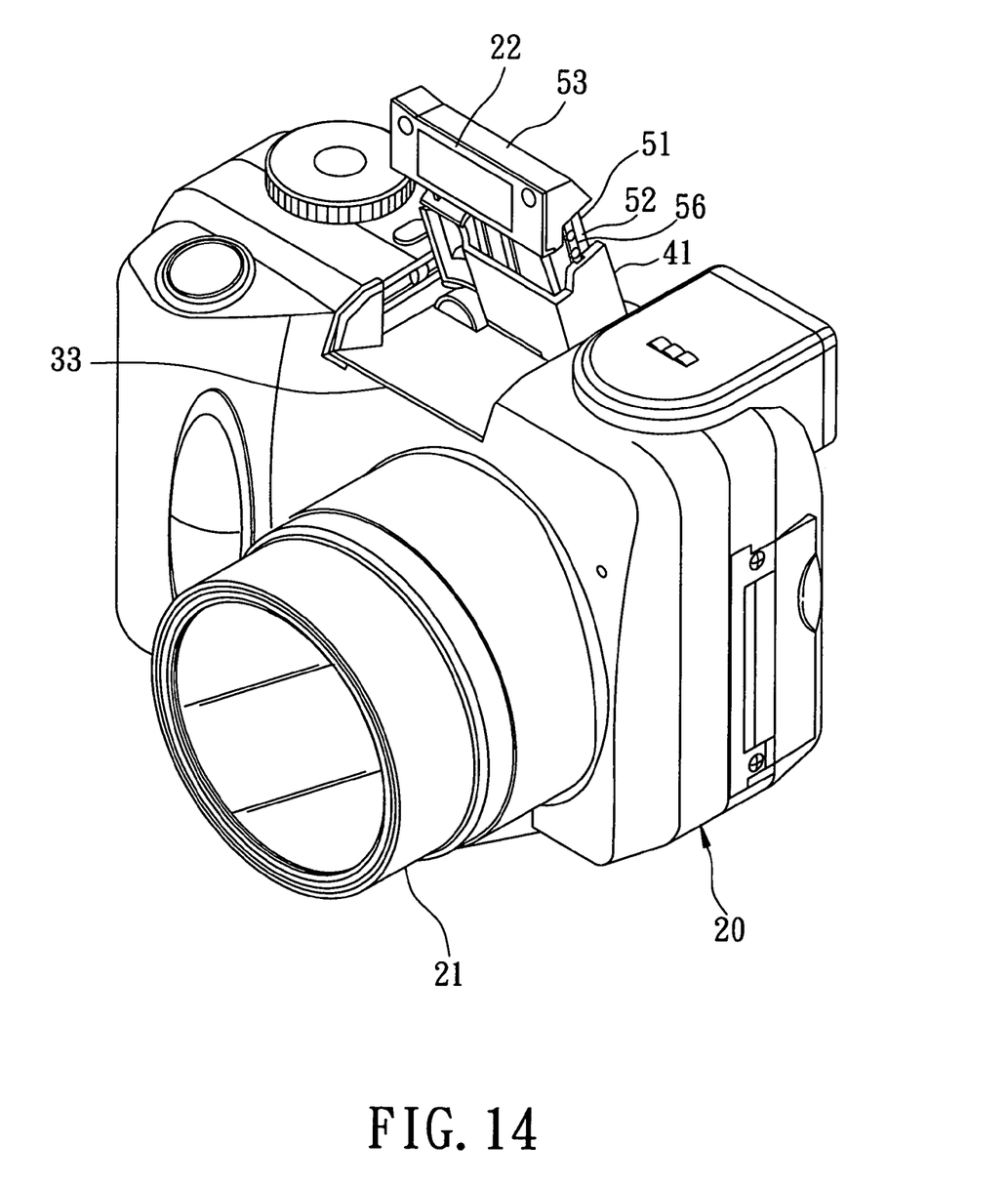
FIG. 14 is an assembled perspective view of the preferred embodiment, illustrating how the flash unit is disposed at a projected position.

When the rotating seat 41 rotates to the position shown in FIGS. 10, 11, and 12 during its movement from the retracted position to the extended position, the second positioning member 72 rotates synchronously with the rotating seat 41 to the position shown in FIG. 13, where the inclined surface portion 735 engages the fixed block 71, so as to separate the engaging arm 74 of the second positioning member 72 from the retaining hook 75, thereby permitting movement of the moving seat 51 relative to the rotating seat 41 from the retracted position to the extended position. As such, when the second surface portion 734 engages the fixed block 71, the engaging arm 74 is also spaced apart from the retaining hook 75.

The advantages of this invention can be summarized as follows:

(1) Because the increase in the distance between the flash unit 22 and the lens 21 is achieved by rotation of the rotating seat 41 and the movement of the moving seat 51, the light distribution angle of the flash unit 22 can be increased effectively so as to improve the photographic quality of the photographic device 20.

(2) When the flash unit 22 is idle, the rotating seat 41 and the moving seat 51 are concealed within the first accommodating chamber 33 in the base frame 30, thereby rendering the photographic device 20 compact.

With this invention thus explained, it is apparent that numerous modifications and variations can be made without departing from the scope and spirit of this invention. It is therefore intended that this invention be limited only as indicated by the appended claims.

We claim:

1. An operating apparatus adapted for moving a pop-up flash unit from a non-projected position to a projected position on a photographic device, said operating apparatus comprising:

a base frame including an accommodating portion that has a first accommodating chamber formed therein and a top end which is formed with a plurality of lugs;

a rotating unit including a rotating seat, a horizontal pivot pin for connecting said rotating seat pivotally to said lugs of said base frame, and a first biasing member for biasing said rotating seat to rotate relative to said base frame from a first position, where said rotating seat is disposed within said first accommodating chamber in said base frame and where the flash unit is disposed at the non-projected position, to a second position, where said rotating seat projects from said first accommodating chamber in said base frame;

a moving unit including a moving seat connected movably to said rotating seat and adapted to be connected fixedly to the flash unit, and at least one second biasing member for biasing said moving seat to move away from said rotating seat from a retracted position to an extended position, where the flash unit is disposed at the projected position, said moving seat being disposed within said first accommodating chamber in said accommodating portion of said base frame when said rotating seat is disposed at said first position;

a rotation-controlling unit including a first positioning member for retaining said rotating seat at said first position, and a starter button adapted to be mounted operably to the photographic device and operable to release said rotating seat from said first positioning member so as to permit rotation of said rotating seat from said first position to said second position;

a movement-controlling unit including a fixed block disposed fixedly on said accommodating portion of said base frame between two of said lugs, a retaining hook connected fixedly to said moving seat, and a second positioning member sleeved movably around said pivot pin and including a fixed engaging arm, and a block-engaging side surface having a first surface portion that is biased to press against said fixed block so as to engage said engaging arm with said retaining hook for retaining said moving seat at said retracted position relative to said rotating seat when said rotating seat is disposed at said first position, and a second surface portion that is biased to press against said fixed block such that said second positioning member moves on said pivot pin so as to release said retaining hook from said engaging arm when said rotating seat rotates from said first position to said second position, thereby permitting movement of said moving seat from said retracted position to said extended position.

2. The operating apparatus as claimed in claim 1, wherein said rotating seat is formed with a second accommodating chamber which has an open top end, said moving seat having a lower insert portion that is disposed movably within said second accommodating chamber in said rotating seat, and an upper mounting portion that is adapted to be connected fixedly to the flash unit, said second biasing member being disposed between said rotating seat and said upper mounting portion of said moving seat.

3. The operating apparatus as claimed in claim 2, further comprising a guiding assembly for guiding said moving seat to move relative to said rotating seat along a direction.

4. The operating apparatus as claimed in claim 3, wherein said guiding assembly includes a straight guide slot formed in said rotating seat, and a guiding block attached fixedly to said lower insert portion of said moving seat and received slidably within said guide slot in said rotating seat.

5. The operating apparatus as claimed in claim 2, further comprising a positioning assembly for retaining said moving seat at said extended position.

6. The operating apparatus as claimed in claim 5, wherein said positioning assembly includes at least one projecting block that is disposed fixedly on said moving seat, and at least one stop block that is disposed fixedly on said rotating seat and that engages said projecting block so as to prevent further movement of said moving seat away from said rotating seat when said moving seat is disposed at said extended position.

7. The operating apparatus as claimed in claim 1, further comprising a guiding assembly for guiding said moving seat to move relative to said rotating seat along a direction.

8. The operating apparatus as claimed in claim 7, wherein said guiding assembly includes a straight guide slot formed in said rotating seat, and a guiding block attached fixedly to said lower insert portion of said moving seat and received slidably within said guide slot in said rotating seat.

9. The operating apparatus as claimed in claim 1, further comprising a positioning assembly for retaining said moving seat at said extended position.

10. The operating apparatus as claimed in claim 9, wherein said positioning assembly includes at least one projecting block that is disposed fixedly on said moving seat, and at least one stop block that is disposed fixedly on said rotating seat and that engages said projecting block so as to prevent further movement of said moving seat away from said rotating seat when said moving seat is disposed at said extended position.

11. The operating apparatus as claimed in claim 1, wherein said movement-controlling unit further includes a coiled compression spring that is sleeved around said pivot pin so as to press said block-engaging side surface of said second positioning member against said fixed block.

12. The operating apparatus as claimed in claim 1, wherein said movement-controlling unit further includes a straight slot that is formed through said rotating seat and that extends along a direction parallel to said pivot pin, said engaging arm of said second positioning member being received slidably within said straight slot in said rotating seat so as to permit synchronous rotation of said moving seat and said rotating seat and movement of said second positioning member along said pivot pin toward and away from said retaining hook.

13. The operating apparatus as claimed in claim 12, wherein said second positioning member further has a flat side surface that is opposite to said block-engaging side surface and that is perpendicular to said pivot pin, said first and second surface portions of said block-engaging side surface of said second positioning member being planar and being parallel to said flat side surface, a distance between said first surface portion of said block-engaging side surface and said flat side surface being smaller than that between said second surface portion of said block-engaging side surface and said flat side surface, said block-engaging side surface of said second positioning member further having an inclined surface portion that interconnects said first and second surface portions, said first, inclined and second surface portions of said block-engaging side surface being arranged along a circumferential direction of said second positioning member.

14. The operating apparatus as claimed in claim 13, wherein said movement-controlling unit further includes a coiled compression spring that is sleeved around said pivot pin and that is disposed between said flat side surface of said second positioning member and one of said lugs of said base frame so as to push said block-engaging side surface of said second positioning member against said fixed block.

15. The operating apparatus as claimed in claim 1, wherein said second positioning member further has a flat side surface that is opposite to said block-engaging side surface and that is perpendicular to said pivot pin, said first and second surface portions of said block-engaging side surface of said second positioning member being planar and being parallel to said flat side surface, a distance between said first surface portion of said block-engaging side surface and said flat side surface being larger than that between said second surface portion of said block-engaging side surface and said flat side surface, said block-engaging side surface of said second positioning member further having an inclined surface portion that interconnects said first and second surface portions, said first, second, and inclined surface portions of said block-engaging side surface being arranged along a circumferential direction of said second positioning member.

16. The operating apparatus as claimed in claim 15, wherein said movement-controlling unit further includes a coiled compression spring that is sleeved around said pivot pin and that is disposed between said flat side surface of said second positioning member and one of said lugs of said base frame so as to push said block-engaging side surface of said second positioning member against said fixed block.

17. The operating apparatus as claimed in claim 1, wherein said rotation-controlling unit further includes a stop rod connected fixedly to said rotating seat, said first positioning member being disposed swingably on said accommodating portion of said base frame and contacting said stop rod so as to prevent rotation of said rotating seat relative to said base frame when said rotating seat is disposed at said first position, operation of said starter button resulting in rotation of said first positioning member so as to separate said first positioning member from said stop rod, thereby permitting rotation of said rotating seat from said first position to said second position.

18. The operating apparatus as claimed in claim 1, wherein said accommodating portion of said base frame is formed with an integral horizontal support rod, said first positioning member including:
  a contact block contacting said starter button such that operation of said starter button can swing said contact block;
  a tubular portion connected fixedly to said contact block and sleeved rotatably around said support rod of said base frame; and
  a pressing block connected fixedly to said contact block and biased to press against said stop rod so as to prevent rotation of said rotating seat relative to said base frame when said rotating seat is disposed at said first position.

19. The operating apparatus as claimed in claim 18, wherein said rotation-controlling unit further includes a torsional spring for biasing said pressing block to press against said stop rod when said rotating seat is disposed at said first position.

20. The operating apparatus as claimed in claim 1, wherein first biasing member is configured as a torsional spring.

21. The operating apparatus as claimed in claim 1, wherein said second biasing member is configured as a coiled compression spring.

* * * * *